July 21, 1936.  H. WOHLDORF  2,048,310
COUPLING DEVICE FOR VEHICLES
Filed Nov. 12, 1935    2 Sheets-Sheet 2
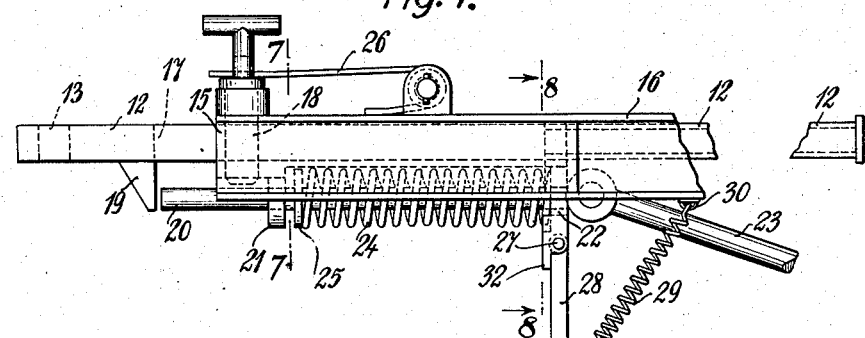
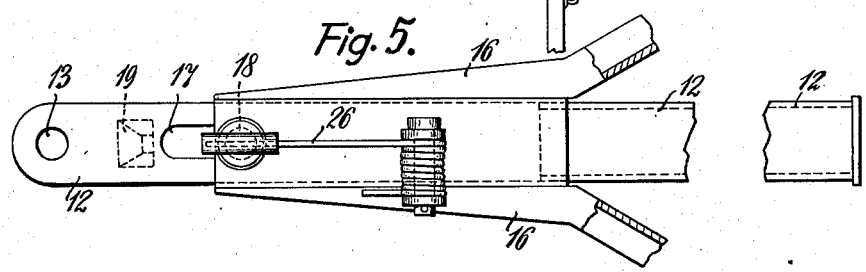
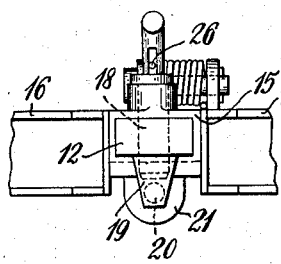
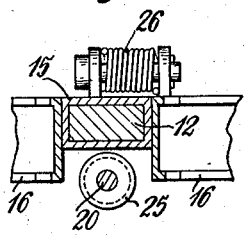
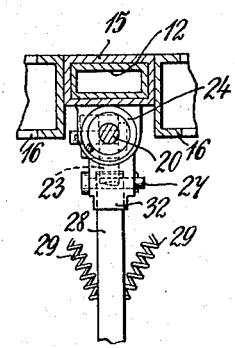
Inventor
Hans Wohldorf
by Bailey & Parson
Attorneys Patented July 21, 1936

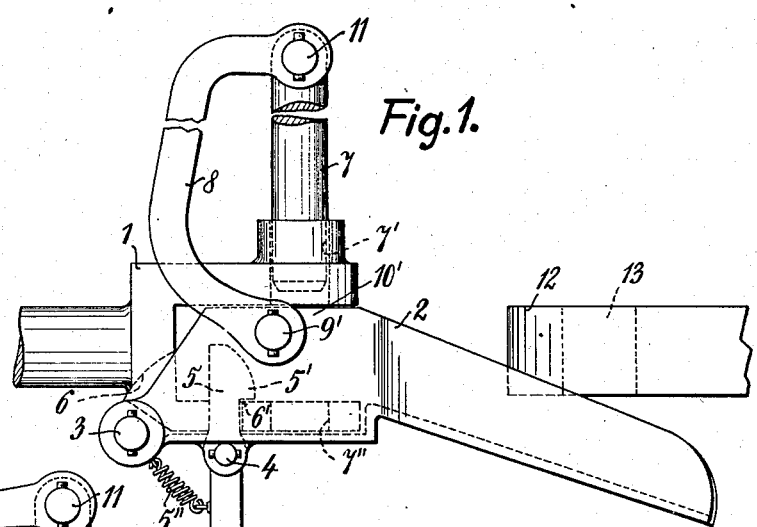
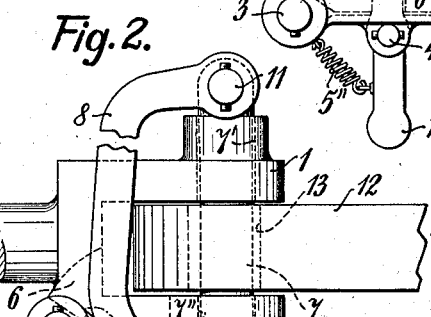
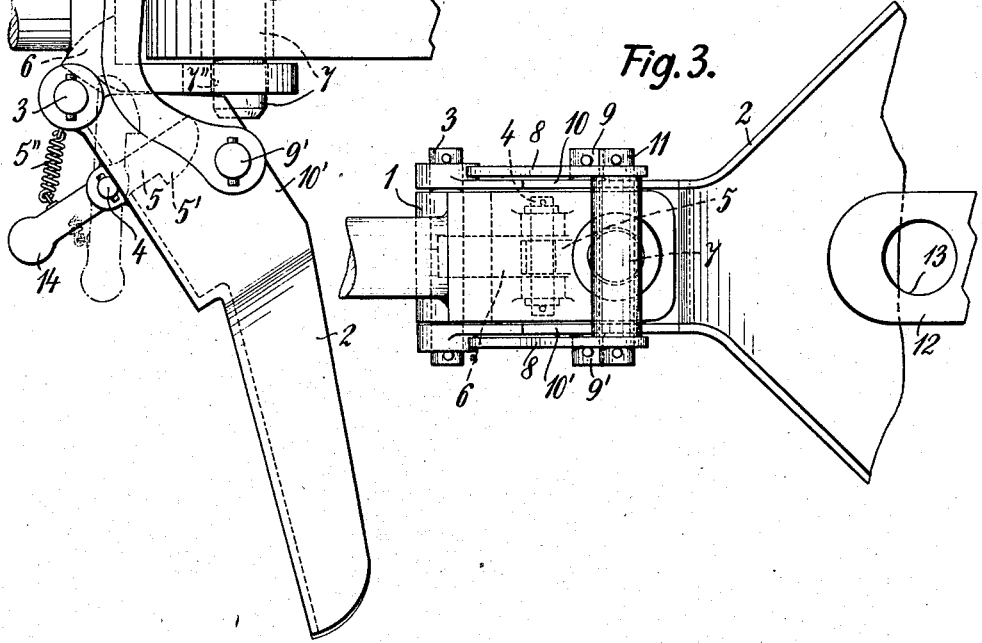

2,048,310

UNITED STATES PATENT OFFICE 2,048,310

COUPLING DEVICE FOR VEHICLES

Hans Wohldorf, Neumunster, Germany

Application November 12, 1935, Serial No. 49,419
In Germany July 7, 1934

12 Claims. (Cl. 280—33.15)

The present invention relates to a coupling device for vehicles, and is particularly applicable to the purpose of coupling trailers to motor vehicles.

Couplers for motor vehicles have already been proposed, in which the coupling member has a forked head for insertion of the drawbar. The forked heads proper of these prior devices are however merely in the form of guiding devices. They permit a slight swivel or lateral deviation only of the drawbar and are therefore not suitable for vehicles operating on undulating or irregular road surfaces. Moreover, they do not allow of automatic coupling between the drawbar and coupling member.

The coupling device of this invention includes a fork-shaped coupling member and a vertically shiftable coupling bolt, associated therewith, the coupling member being provided with a hinged guide plate for the drawbar. According to one form of the invention, which may be preferred in practice, the guide plate is connected to the coupling bolt by suitable means, for example by links, and the arrangement is such that when the coupling bolt moves into the coupling eye of the drawbar, the guide plate is removed beyond the range of the drawbar.

The guide plate is suitably connected with the coupling fork head by a hinge and is flared out towards the end opposite to the hinge, the plate in the example shown being provided with guide walls.

The guide plate is also provided with a catch, for example a pawl, which acts to interlock the guide plate in the "ready-for-coupling" position with the coupling fork head. This pawl is released in the course of effecting the coupling, for example by the drawbar and, in the coupled position, keeps the guide plate beyond the range of the drawbar and simultaneously locks the coupling bolt in the coupled position.

The coupling device is preferably actuated by gravity or suitable mechanical means, at the moment when the drawbar comes into contact with the components of the coupling, for example with the catch, the guide plate being thus permitted to move out of the path of the drawbar and becoming locked in this position while the coupling bolt is simultaneously brought into the coupling position.

The invention also has for its object to provide a drawbar attachment for this coupling device which is longitudinally shiftable, having at its front end a coupling eye, and intermediate its length a slotted hole, the drawbar being supported in a yielding manner in the drawbar attachment by suitable means, for example by a spring. The drawbar is preferably slidably held within a guide sleeve, a guide head or drawbar guide, in which it can be locked, for example by means of a bolt. The bolt is subjected to the pressure of a spring, by which it is pressed into the profile section of the drawbar sleeve. The displacement of the drawbar relative to its guide is suitably limited, for example by a stop, in order to limit the spring and braking effect by virtue of which the concussions of the vehicle are transmitted to the spring of the brake rod arranged on the drawbar sleeve of the drawbar and which has simultaneously a braking effect in case the trailer should run up against the motor vehicle. The drawbar of the drawbar attachment is suitably coupled with the trailer brake by means of the spring for intercepting the concussions in such a manner that the latter are damped by the braking effect produced.

According to the invention, a leg is also suitably linked to the drawbar attachment in the neighborhood of the drawbar sleeve, which may be supported on the ground and is preferably subjected to spring-action in such a manner that when the vehicle is started, the leg is lifted and remains in this position.

In the drawings some forms of the invention are shown by way of example.

Fig. 1 is a side elevation of a constructional form of the coupling device according to the present invention, Fig. 2 shows the device in the operative or coupled position, Fig. 3 is a plan view of the device shown in Fig. 1, Fig. 4 is a side elevation of a drawbar attachment according to the present invention, Fig. 5 is a plan view of the drawbar attachment according to Fig. 4, Fig. 6 is an end elevation of the device shown in Figs. 4 and 5, Fig. 7 is a cross sectional view taken on line 7—7 of Fig. 4, and Fig. 8 is a cross-section taken on the line 8—8 of Fig. 4 looking in the direction of the arrow.

Referring to Figs. 1, 2, and 3 the trailer coupler consists of a coupling member or fork head 1, which can be fitted on the rear part of a motor vehicle. A guiding device or guide plate 2 for the trailer drawbar 12 to be coupled, is linked to the fork head 1 with the aid of a bolt 3. The guide plate 2 is in the form of a trough or channel with lateral walls 10, 10' which are flared to the rear.

The guide plate 2 can swivel up and down around the bolt 3, held in the fork head 1. The guide plate 2 is held up by means of the pawl 5 with the projection 5', fastened upon the bottom and swivelling around the bolt 4. Pawl 5 protrudes through a slot 6 of the fork head 1 into the fork head 1 and is held in the coupled position by the spring 5''. In the upper part of the fork head 1, vertically shiftable within a hole 7', 7'', a coupling bolt 7 is provided which, in the coupled position, passes through the eye 13 of the trailer drawbar 12 and couples the latter with the coupling fork head 1.

The coupling bolt 7 in the fork head 1 is held by the two links 8, supported on the right and left by studs 9, 9', fitted on the guide walls 10, 10', of the guide plate 2 and by the bolt 11 in the coupling bolt 7.

The guide plate 2 and the bolt 7 are simultaneously brought into the lifted "ready-for-coupling" position shown in Fig. 1, by lifting the guide plate 2 to such an extent that the projection 5' of the pawl 5 will catch into the fork head 1. Then the front or driven vehicle is moved back towards the trailer or the trailer is pushed towards the driven vehicle, care having only to be taken that the drawbar 12 is kept in the direction of the guide plate 2 and that it finds its way into the latter. As the pawl 5 is engaged by the drawbar 12 it is forced back to such an extent that the projection 5' can slip off the edge 6' of the slot 6, the guide plate 2 and simultaneously the coupling bolt 7 will move down by gravity, the coupling bolt 7, guided in the hole 7', 7'', being pulled through the eye 13 of the drawbar 12 into the position shown in Fig. 2. The process of coupling has thus been accomplished. Accidental uncoupling of the coupling, due to vibration or concussions, is not possible as, due to the effect of the spring 5'', the spring-actuated pawl 5 will now assume a position beneath the fork head 1 and will keep the guide plate 2 from being lifted up.

When the vehicles are to be uncoupled, the spring-actuated pawl 5 must first be turned back into the position shown in Fig. 2 (dot and dash lines) by means of the handle 14, in order that the pawl may take its correct position towards the slot 6 of the fork head 1. Then the guide plate 2 and simultaneously the coupling bolt 7 are lifted up and out of the hole 13 in the drawbar 12. The drawbar 12 is then pulled out of the fork head 1 by moving the vehicles apart. By releasing the pawl 5, it will snap back into the fork head 1 and will keep the guide plate 2 in the "ready-for-coupling" position.

Figs. 4–8 show the drawbar attachment according to the invention, with the drawbar sleeve 15 of hollow rectangular section. To the right and left of the sleeve 15, stays of channel-section 16 are welded on in a known manner. Within the drawbar sleeve 15, the drawbar 12 is arranged so as to be axially displaceable. The front part of the drawbar proper 12 may consist of a solid bar of rectangular section and the rear part of a square tube, closed or open. The eye 13 for receiving the coupling bolt 7 is arranged at the front end of the drawbar 12. Intermediate its length drawbar 12 is provided with a slotted hole 17. Within the drawbar sleeve 15 there is a hole (not shown) in which a bolt 18, subjected to the pressure of a spring 26, is vertically movable. In order to lock the drawbar 12 in the drawbar sleeve 15, the bolt 18 may be inserted into the slotted hole 17 of the drawbar 12.

On the bottom of the drawbar 12 a stop 19 is provided in front of the slotted hole 17. The stop 19 is in contact with a rod 20 arranged underneath the drawbar sleeve 15, held in flanges 21 and 22. The rod 20 is linked to the brake rod 23 of the trailer brake gear, not shown in the drawing. This rod is forced in the direction of the stop 19 by a spring 24 provided on the rod 20 between the flange 22 of the drawbar sleeve 15 and the flange 25.

The rear part of the drawbar 12 is hollow in order to save in weight and may consist of a tube of rectangular section or of channel-iron, the legs of which are suitably bent inwards at right angles, in order to produce a better support.

When a driven vehicle is to be coupled with a trailer, the driven vehicle is moved backwards up to a distance of approximately 4 to 7 feet from the trailer and then stopped. The bolt 18 in the drawbar sleeve 15 is then lifted up, the drawbar 12 pulled out of the drawbar sleeve 15 to such an extent that the eye 13 is underneath the coupling eye or coupling bolt 7 of the driven vehicle. The motor vehicle is then again moved backwards until the drawbar 12 has been completely pushed into the drawbar sleeve 15 and the bolt 18, due to the pressure of the spring 26, has fallen into the slotted hole 17 of the drawbar 12. This occurs as soon as the stop 19 has come into contact with the rod 20 and has compressed the spring 24.

When the coupled vehicles are moving the concussions there between are intercepted by the spring 24. Should the trailer run up against the driven vehicle, owing to the brake of the motor vehicle being applied or when moving downhill, the trailer brake will be automatically applied by reason of the rod 20 being forced backwards. The brake will be released as soon as the thrust acting upon rod 20 ceases.

A leg 28 is suitably fastened and is capable of swivelling around a bolt 27 on the flange 22, in order to support the drawbar 12 at the required height, when inserting the drawbar 12 into the sleeve 2 of the coupling device, when coupling in the position shown in Fig. 1. When the vehicle is started, the springs 29, which may be fastened to the stays 16 at 30 and to the leg 28 at 31, will pull the leg 28 from off the ground and will keep the latter in this lifted position. The stop 32 will prevent the leg from tilting over in the direction of the coupler.

As shown in the drawings, the swivel or tiltable leg 28 may be made of a bar of iron or of some other suitable material. It may however also consist of two parallel rods or the latter may diverge downwards. The leg 28 enables the coupling process to be effected single handed. As described above, the two vehicles are first moved towards one another, allowing an approximate distance of 3 feet between them. By turning the drawbar 12 sidewise, easily accomplished without having to use any great force, the drawbar attachment is swung into the direction of the sleeve 2. Finally the drawbar attachment is supported at the required height with the aid of the leg 28, the drawbar attachment thus taking approximately the position shown in Fig. 1.

The invention is not necessarily confined to the specific form described herein and various constructional modifications may be introduced without departing from the scope of the appended claims.

I claim:

1. A coupling device for vehicles, which includes a forked coupling member, a movable coupling bolt carried by said member, a drawbar having an aperture therein to receive said coupling bolt, a guide member movable relative to said coupling member and said drawbar and arranged to guide the latter into engagement with said forked coupling member and said coupling bolt, and means, releasable by said drawbar, for holding said coupling bolt in the inoperative position.

2. A coupling device for vehicles, which includes a forked coupling member, a movable coupling bolt carried by said member, a drawbar having an aperture therein to receive said coupling bolt, a guide member mounted upon said coupling member so as to be movable relative thereto, said guide member being arranged to receive and guide said drawbar into engagement with said forked coupling member and said coupling bolt, and means releasable by said drawbar for moving and latching said coupling bolt in the operative position.

3. A coupling device for vehicles which includes a forked coupling member, a movable coupling bolt carried by said member, a drawbar having an aperture therein to receive said coupling bolt when the latter is moved, a guide member movable relative to said forked coupling member, said guide member being arranged to receive and guide said drawbar into register with said forked coupling member and said coupling bolt, link means for connecting said guide plate to said coupling bolt so that said movement of said guide plate and the movement of said coupling bolt into the aperture of said drawbar are interrelated, and means, releasable by said drawbar for holding said coupling bolt in the inoperative position.

4. A coupling device for vehicles which includes a forked coupling member, a movable coupling bolt carried by said member, a drawbar having an aperture therein to receive said coupling bolt when the latter is moved, a guide member pivotally mounted upon said forked coupling member so as to be movable relative thereto, said guide member comprising a plate flared out towards the end thereof which faces the drawbar, and lateral guide walls projecting from the surface of said guide plate; and means releasable by said drawbar for moving and latching said coupling bolt in the operative position.

5. A coupling device for vehicles, which includes a forked coupling member, a movable coupling bolt carried by said member, a drawbar having an aperture therein to receive said coupling bolt, a guide member mounted upon said forked coupling member so as to be movable relative thereto, said guide member being arranged to receive and guide said drawbar into register with said coupling member and said coupling bolt, and a catch device associated with said guide member to hold the latter in position, to receive said drawbar, and means on said drawbar for tripping said catch when said drawbar is moved into coupling position.

6. A coupling device for vehicles, which includes a forked coupling member, a movable coupling bolt carried by said member and arranged to move by gravity to assume operative coupling position, a drawbar having an aperture therein arranged to register with and receive said coupling bolt, a guide member mounted upon said forked coupling member, a catch device associated with said guide member to hold the latter in position to receive and guide said drawbar into register with said coupling member and coupling bolt, and link means connecting said coupling bolt to said guide member so that said catch is effective to hold said coupling bolt in inoperative position, while at the movement of said coupling bolt into coupling position said guide member is moved away from said drawbar.

7. A coupling device for vehicles, which includes a forked coupling member having aligned apertures passing through the prongs thereof, a coupling bolt arranged to move freely through said apertures, a drawbar arranged to engage between the prongs and having an aperture to receive said coupling bolt, a guide plate movably mounted upon said coupling member, a catch mounted upon said guide plate and arranged to engage said coupling member to hold said guide plate in a position to receive and guide said drawbar between prongs and into register with said coupling bolt, said catch being arranged so as to be tripped by said drawbar, and link means for connecting said coupling bolt to said guide member so that when said catch is tripped by said drawbar said guide member moves away from said drawbar and draws said coupling bolt through said apertures in said drawbar and said forked coupling member to effect the desired coupling.

8. A coupling device for vehicles as claimed in claim 7 in which the catch comprises a hook pivotally mounted on said guide member, and means for resiliently holding said hook in a position to engage the outer edge of one of said prongs so as to lock said guide member and said coupling bolt in the coupling position.

9. A coupling device for vehicles, which includes a forked coupling member, a substantially vertical coupling bolt arranged to pass through the prongs of said member transversely thereof, a drawbar adapted to enter between the prongs of said coupling member and having an aperture to receive said coupling bolt, a guide member movable relative to said coupling member and arranged to guide said drawbar into coupling position, and means releasable by said drawbar for holding said coupling bolt in the inoperative position.

10. A coupling device for vehicles, which includes a forked coupling member, a substantially vertical coupling bolt arranged to pass through the prongs of said member transversely thereof, a drawbar arranged to enter between the prongs of said coupling member and having an aperture to receive said coupling bolt, a guide member pivotally mounted upon said coupling member and arranged to guide said drawbar into coupling position, link means connecting said coupling bolt to said guide member so that said bolt is upheld in inoperative position when said guide member is positioned to guide said drawbar and means releasable by said drawbar for retaining said guide member in said operative position.

11. A coupling device for vehicles, which includes a forked coupling member, a substantially vertical coupling bolt arranged to pass through the prongs of said member transversely thereof, a drawbar adapted to enter between the prongs of said coupling member and having an aperture to receive said coupling bolt, a guide member pivotally mounted upon said coupling member so as to move away from said drawbar by gravity, a catch member retaining said guide member in a position to guide said drawbar into coupling position, said catch being tripped by contact with said drawbar to release said guide member, and link means for connecting said guide member to said coupling bolt so that said bolt is suspended in inoperative position when said guide member is operative, and is lowered to couple said coupling member to said drawbar when said guide plate moves away from said drawbar.

12. A coupling device as claimed in claim 11, in which the catch is mounted upon said guide member and so arranged as to lock the latter in the inoperative position and to retain said coupling bolt in the operative position.

HANS WOHLDORF.